United States Patent [19]

Elliott

[11] 4,191,160
[45] Mar. 4, 1980

[54] COLLAPSIBLE BARBECUE

[75] Inventor: William G. Elliott, Smiths Falls, Canada

[73] Assignee: Roger's Plating Limited, Ontario, Canada

[21] Appl. No.: 862,040

[22] Filed: Dec. 19, 1977

[51] Int. Cl.² .............................................. F24B 3/00
[52] U.S. Cl. ................................. 126/9 R; 126/25 R; 211/181; 99/450
[58] Field of Search ............ 126/9 R, 9 A, 9 B, 25 R, 126/30, 25 A; 211/181; 99/450, 421, 448, 449

[56] References Cited

U.S. PATENT DOCUMENTS

| 2,122,275 | 6/1938 | Bitney | 126/30 |
|---|---|---|---|
| 2,158,805 | 5/1939 | Smith | 126/25 A |
| 2,799,401 | 7/1957 | Duchin | 211/181 |
| 3,177,864 | 4/1965 | Bowman | 126/9 R |
| 3,306,281 | 2/1967 | Hoebel | 126/25 R |
| 3,648,679 | 3/1972 | Quinn | 126/9 R |

Primary Examiner—Samuel Scott
Assistant Examiner—Lee E. Barrett

Attorney, Agent, or Firm—Armstrong, Nikaido, Marmelstein & Kubovcik

[57] ABSTRACT

A collapsible cooking rack arrangement comprises a first rack for supporting food to be cooked, a second rack for supporting a heat source and a pair of end supports for holding the racks in mutually vertically spaced, horizontally parallel relationship with the first rack above the second rack. The end supports each include means for releasably supportingly engaging the first rack so that the latter is readily removable, and the end supports are pivotally connected to opposite ends of the second rack, so that the end supports are pivotably between collapsed positions, in which they are compactly folded with the second rack, and erected positions in which they can be engaged with the first rack. Locking member are releasably engageable with eyes on the end supports for locking the latter in the erected positions, and the racks and the end supports are made of wire. The arrangement is inexpensive to manufacture, light and compact to transport and stable when erected.

8 Claims, 1 Drawing Figure

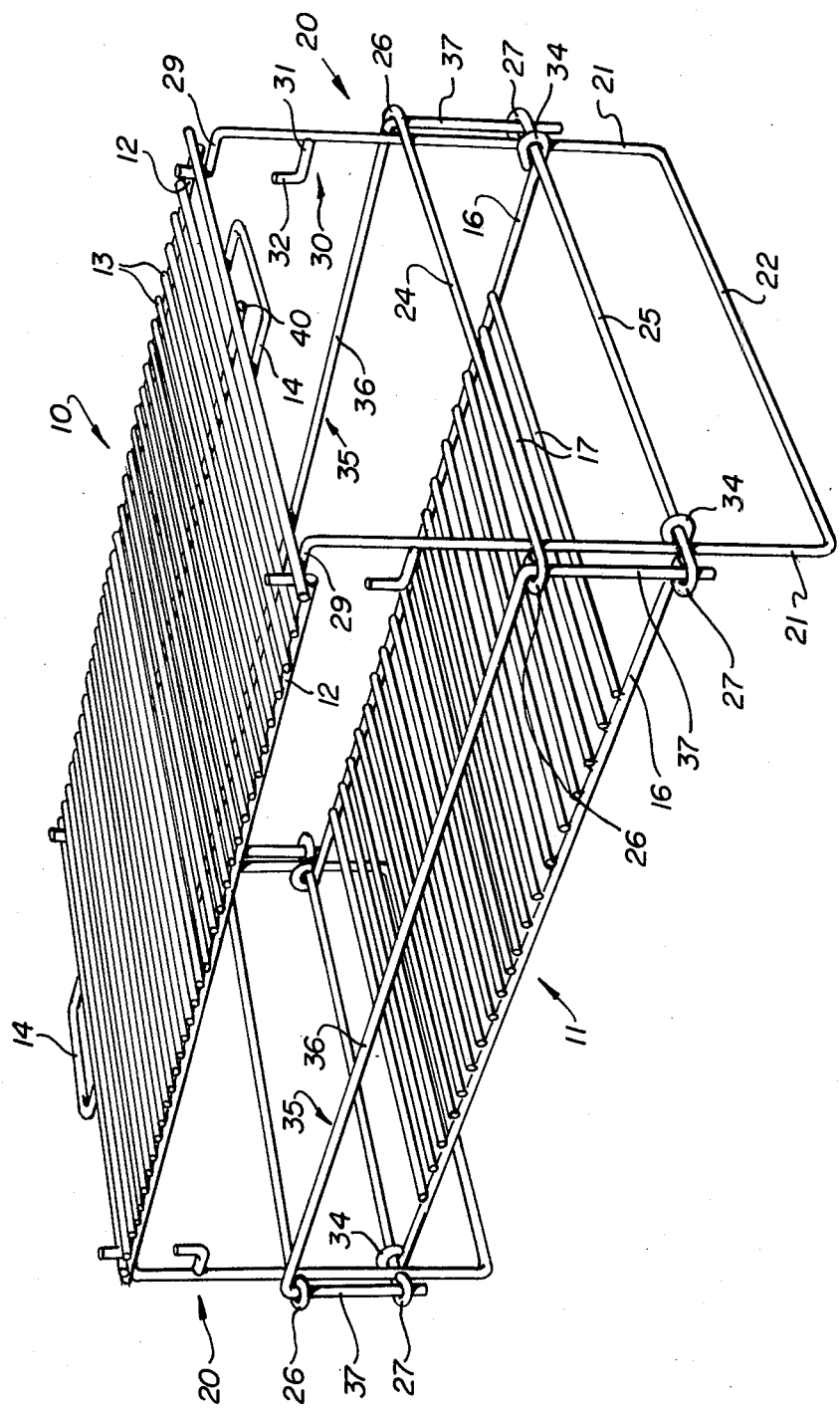

COLLAPSIBLE BARBECUE

FIELD OF THE INVENTION

The present invention relates to a collapsible cooking rack arrangement for use, for example, in camping and picnicing.

PRIOR ART

At the present time, various types of portable barbecues are in widespread use, and one particular form of conventional barbecue is in the form of an open-topped shell of cast metal provided with a removable grill.

However, this prior barbecue has the disadvantages that it is relatively heavy, and also that it is bulky and relatively cumbersome and cannot be compactly accommodated, for example, among camping equipment or in the trunk of an automobile.

OBJECTS OF THE INVENTION

It is an object of the present invention to provide a novel and improved collapsible cooling rack arrangement which can be readily folded for storage and transportation and which can be readily erected for use.

It is a further object of the present invention to provide a collapsible cooking rack arrangement which is of lightweight and inexpensive construction.

It is a still further object of the present invention to provide a collapsible cooking rack arrangement which is made of wire and which can be folded into a substantially flat and compact condition.

BRIEF SUMMARY OF INVENTION

According to the present invention, a collapsible cooking rack arrangement comprises a rack for supporting food to be cooked, means for supporting a heat source and a pair of end supports for holding the rack and the support in mutually vertically spaced relationship. The end supports each include means for releasably supportingly engaging the rack, whereby the rack is readily removable from the end supports, which are pivotally connected to opposite respective ends of the support means, whereby the end supports are pivotable relative to the support means between collapsed positions, in which the end supports are compactly folded with the support means, and erected positions, in which the engaging means are engageable with the rack. Means are provided for locking the end supports in the erected positions.

In a preferred embodiment of the invention, the locking means comprise a vertically spaced pair of eyes at opposite ends of each of the end supports, and at least one elongate locking member for engagement with the eyes at a respective side of the rack arrangement, the locking member having at each end thereof a projection releasably engageable in a respective one of the pairs of eyes.

To provide a lightweight and inexpensive construction of the rack arrangement, the rack, the support means and the end supports may all be made of wire. In that case, the wire can be bent to form the engaging means and the eyes, and also to provide the pivotal connections between the end supports and the support means, so that the arrangement is simple and inexpensive to manufacture.

BRIEF DESCRIPTION OF THE DRAWINGS

Further features, objects and advantages of the invention will be more readily apparent from the following description of the preferred embodiment thereof given, by way of example, with reference to the accompanying drawing, which shows a view in perspective of a collapsible cooking rack arrangement.

PREFERRED EMBODIMENT OF INVENTION

The cooking rack arrangement illustrated in the drawings has an upper rack 10 for supporting food to be cooked and a lower rack 11, which serves as a means for supporting a heat source below the upper rack 10.

When the present cooking rack arrangement is in use, the preferred heat source, which is charcoal, is suitably supported by means of a sheet of aluminum foil (not shown) or a metal tray (not shown) on the lower rack 11.

The upper and lower racks 10 and 11 are each formed of a plurality of lengths of cold rolled low carbon steel electroplated wire which are welded together.

More particularly, the upper rack 10 comprises two parallel, longitudinally extending and laterally spaced wires 12, and a plurality of parallel, mutually spaced, transversely extending wires 13 which are welded, at opposite ends thereof, to the wires 12. The two wires 13 at opposite ends of the upper rack 10 are each provided with a respective U-shaped wire 14 welded thereto and projecting from the respective end of the upper rack 10 to form a handle.

The lower rack 11 is formed of two parallel, longitudinally extending, laterally spaced wires 16, and a plurality of transverse, parallel, mutually spaced wires 17 which are welded at opposite ends thereof to the wires 16.

The upper and lower racks 10 and 11 are held, when the cooking rack arrangement is in use and in the erected condition illustrated in the drawing, in horizontally parallel, vertically spaced relationship, with the lower rack 11 beneath the upper rack 10, by a pair of end supports indicated generally by reference numeral 20. Each of the end supports 20 comprises a wire which is bent to provide two parallel, vertical side portions 21 and an intermediate bottom portion 22 connecting together the lowermost ends of the side portions 21, so that this wire has a generally U-shaped configuration.

Also, each end portion 20 is braced by a pair of vertically spaced, parallel and horizontal wire braces 24 and 25 which are welded to the side portions 21 intermediate the ends of the side portions 21.

The ends of the wire braces 24 and 25 project laterally beyond the sides of the respective end support 20 and are bent to form eyes 26 and 27.

The eyes 26 and 27 are horizontally disposed in vertical alignment with one another, so that their openings are in vertical alignment at each side of the respective end support 20.

The uppermost end of each side portion 21 of each end support 20 is bent twice to form a shoulder 29 which serves as a rest or support for the respective intermost one of the transverse wires 30 of the upper rack 10. In this way, the end supports 20 are provided with means for readily releasably supportingly engaging the upper rack 10 when the end supports are in their erected positions as illustrated in the drawing.

In addition, each side portion 21 has welded thereto, beneath its shoulder 29, a relatively short L-shaped wire, indicated generally by reference numeral 30, which has a horizontal leg 31 parallel to the shoulder 29 and a vertical leg 32 parallel to the side portion 21. The four wires 30 are located at the same height above the intermediate bottom wire portions 22 and serve, when required, to support the upper rack 10 in a position lower than that illustrated and closer to the lower rack 11.

The wires 30 are welded to the sides of the end portions 21 facing longituinally of the cooking rack arrangement in order to ensure that, on pivotation of the end supports 20 into their collapsed positions, as described in greater detail hereinafter, the wires 30 can pass to opposite sides of the lower rack 11 without being obstructed thereby.

The end supports 20 are pivotally connected to opposite ends of the lower rack 11 by pivotal connections between the former and the latter. In the illustrated embodiment of the invention, these pivotal connections are provided in the form of eyes 34 at opposite ends of the longitudinal side wires 16 of the lower rack 11 and by the lowermost wire braces 25 of the end supports 20, which extend through the eyes 34 as shown, the eyes 34 at each end of the lower rack 11 having their openings in mutual horizontal alignment.

A pair of locking members, indicated generally by reference numeral 35, are provided for securely and releasably locking the end supports 20 in their vertical, erected positions relative to the lower rack 11.

Each of the locking members 35 comprises a wire rod having a straight intermediate portion 36 and bent to provide two end portions 37, at opposite ends of the intermediate portion 36, which project laterally from the intermediate portion 36 at right angles thereto.

As can be seen from the drawings, each end portion 37 extends downwardly from its intermediate portion 36 through a respective pair of the eyes 26 and 27, and in this way the end supports 20 are locked in their vertical erected positions relative to the lower rack 11. The lengths of the end portions 37 of the locking members 35, and the vertical spacing of the respective pairs of eyes 26 and 27, are made large enough to ensure that the end supports 20 are held rigidly in their erected positions, the end portions 37 extending through the eyes 26 and 27 with clearances which are sufficient to facilitate insertion of the end portions 37 through the eyes 26 and 27 but which are also small enough to avoid any substantial looseness in the connections between the locking members 35 and the end supports 20. The upper rack 10 is nickel electroplated to avoid food contamination, and the lower rack 11, the two end supports 20 and the locking members 35 are zinc plated to counteract rusting.

Also, the upper rack 10 is strengthened by a central, longitudinal reinforcement wire 40.

In the present embodiment of the invention, the wires 12 and 13 of the upper rack 10 are of 3/16" diameter, and the wires 16 and 17 of the lower rack 11 are of ⅛" diameter.

As will be apparent from the above description, the rack is illustrated in the drawing in its erected position in which it is ready for use and, as mentioned hereinabove, the cooking rack arrangement is preferably employed with charcoal as a heat source, the charcoal being supported on aluminum foil or a tray resting on the lower rack 11.

When food resting on the upper rack 10 has been cooked, it can either be removed from the upper rack 10 while the latter is left in position on the end supports 20 or, for greater serving convenience, the upper rack 10 with the food thereon can be lifted, by means of the handles 14, from the end supports 20.

When the cooking rack arrangement is not in use, it can be readily collapsed for compact storage or transportation by lifting the upper rack 10 away from the end supports 20 and by drawing the locking members 35 upwardly so that the end portions 37 thereof are disengaged from the eyes 26 and 27. The end supports 20 can then be readily pivoted downwardly relative to the lower rack 11 into collapsed positions in which the side portions 21 of the end supports 20 extend at least substantially parallel to the longitudinal wires 16 of the lower rack 11, and the shoulders 29 and wires 30 of the end supports 20 are disposed at opposite sides of the lower rack 11. In this way, the end supports 20 can be folded into a nested position relative to the lower rack 11 so that the end supports and the lower rack 11 form a compact, substantially flat assembly and, of course, the upper rack 10 and the locking members 35 can be laid flat on this assembly.

I claim:

1. A collapsible cooking rack arrangement, comprising:
    a first wire rack for supporting food to be cooked;
    a second wire rack for supporting a heat source;
    a pair of end supports for holding said first and second racks in mutually vertically spaced relationship;
    said end supports each including means for releasably supportingly engaging said first rack, whereby said rack is readily removable from said end supports;
    means for pivotally connecting said end supports to opposite respective ends of said second rack at points intermediate the tops and bottoms of said end supports, whereby said end supports are pivotable relative to said second rack between collapsed positions, in which said end supports are compactly folded with said second rack, and erected positions, in which said second rack is raised above the bottoms of said end supports to provide ground clearance and said engaging means are engageable with said rack; and
    means for locking said end supports in the erected positions.

2. A collapsible cooking rack arrangement as claimed in claim 1, wherein said locking means comprising a vertically spaced pair of eyes at opposite sides of each of said end supports; and
    at least one elongate locking member for engagement with said eyes at a respective side of said rack arrangement;
    said locking member having at each end thereof a projection releasably engageable in a respective one of said pairs of eyes.

3. A collapsible cooking rack arrangement as claimed in claim 2, wherein said eyes comprise bent end portions of wires extending across said end supports.

4. A collapsible cooking rack arrangement as claimed in claim 1, wherein said end supports each comprise a U-shaped wire having two parallel side portions and an intermediate portion connecting together one end of each of said side portions, the opposite ends of said wire portions each being bent to provide a shoulder forming said engaging means.

5. A collapsible cooking rack arrangement as claimed in claim 2, wherein said end supports each comprise a U-shaped wire having two parallel side portions and an intermediate portion connecting together one end of each of said side portions, a pair of spaced parallel wire braces extending between and secured to said side portions, said wire braces each having opposite end portions which project beyond said side portions and are bent to form said eyes.

6. A collapsible cooking rack arrangement as claimed in claim 5, wherein said pivotal connecting means comprise wire end portions projecting at the opposite ends of said second rack and bent around said one of said parallel wire braces of each of said end supports.

7. A collapsible cooking rack arrangement as claimed in claim 4, wherein said two parallel side portions and said shoulders thereof are spaced apart sufficiently to lie at opposite sides of said second rack when said end supports are in the collapsed positions.

8. A collapsible cooking rack arrangement as claimed in claim 1, wherein said first rack includes handle means for facilitating removal of said first rack from said end supports, whereby cooked food can readily be removed on said first rack from the remainder of said rack arrangement.

* * * * *